March 30, 1937.  H. E. TAUTZ  2,075,240
SPEED CHANGE MECHANISM FOR SCREW MACHINES
Filed June 28, 1935
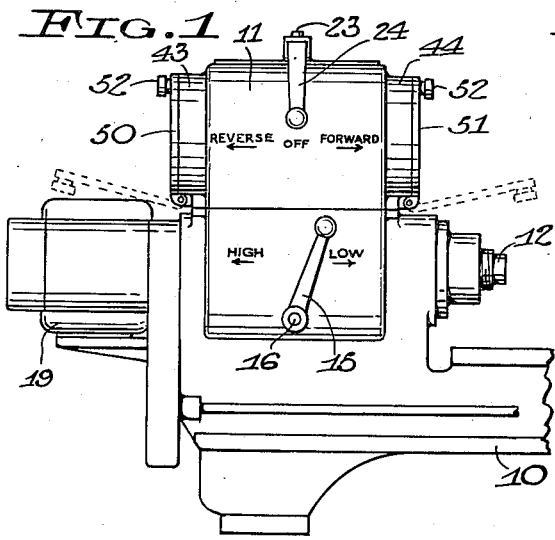
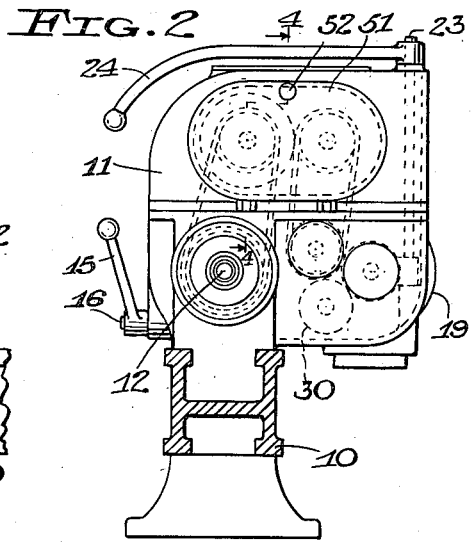
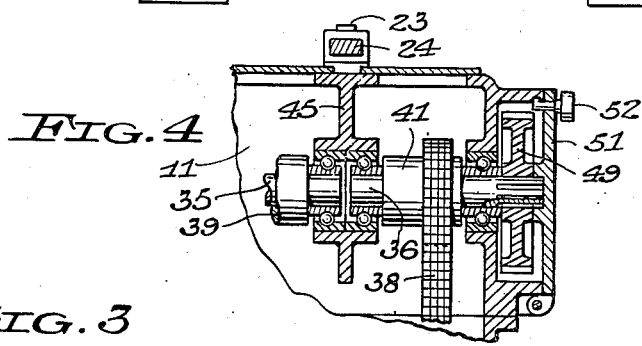
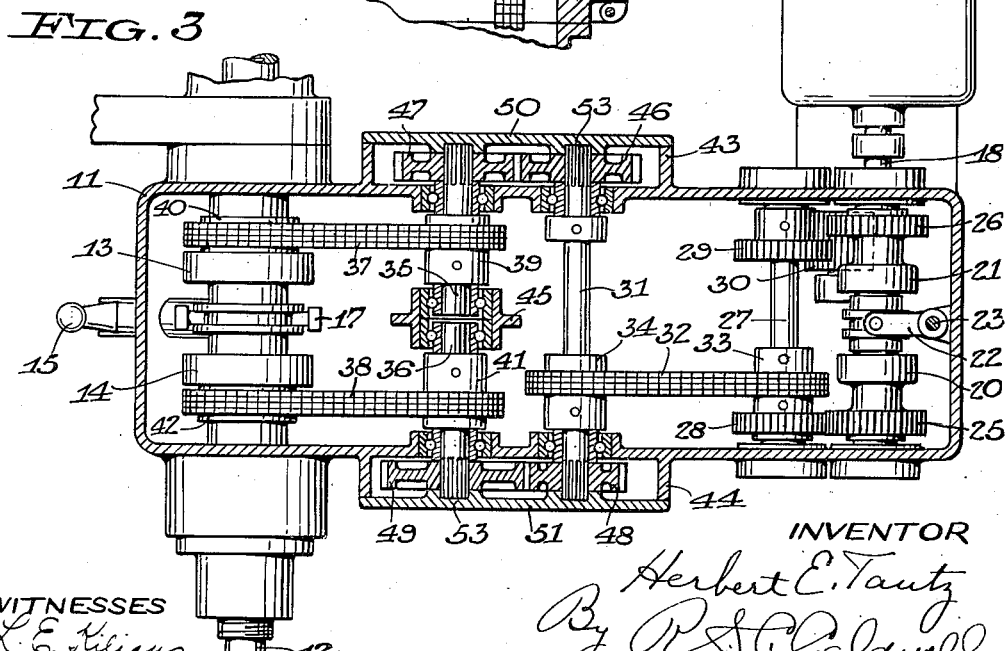
INVENTOR
Herbert E. Tautz
By R. S. Caldwell
ATTORNEY
WITNESSES
L. E. Kilian
C. L. Neal Patented Mar. 30, 1937

2,075,240

UNITED STATES PATENT OFFICE 2,075,240

SPEED CHANGE MECHANISM FOR SCREW MACHINES

Herbert E. Tautz, Milwaukee, Wis.

Application June 28, 1935, Serial No. 28,820

1 Claim. (Cl. 74—360)

The invention relates to speed-change mechanism for machine tools, more particularly of the screw-machine type.

It has been customary in some types of screw-machines to provide a two-speed spindle with friction clutch means for quickly changing from one speed to the other so as to suit different cutting operations on the same work piece, the change in speed being effected without stopping the spindle. In constructions heretofore devised, the ratio between the high and low spindle speeds has been fixed to meet average requirements. However, if the low spindle speed is proper for one of two successive cutting operations on the work and the high spindle speed is too high for the second cutting operation, then the operator has been obliged to use the low speed for both cutting operations with consequent loss of time and efficiency. If the second cutting operation permits a speed higher than the high spindle speed, there is again a loss of time and efficiency.

An object of the present invention is to provide driving means for a quick-change multiple-speed spindle, whereby the ratio between high and low spindle speeds can be readily adjusted in small increments to suit various kinds of work.

Another object of the invention is to utilize the same driving means for adjusting the ratio between the high and low spindle speeds and for changing both spindle speeds.

The invention further consists in the several features hereinafter described and claimed.

In the accompanying drawing, illustrating one embodiment of the invention,

Fig. 1 is a front elevation of a screw-machine head constructed in accordance with the invention;

Fig. 2 is another elevation of the head;

Fig. 3 is a developed sectional view of the gearing, and

Fig. 4 is a sectional view taken on the line 4—4 of Fig. 2.

In the drawing, 10 designates the bed of a screw-machine, such as an automatic turret lathe, having at one end a head casing 11. A hollow spindle 12 of usual construction is journalled in the casing 11 and is provided with friction clutches 13 and 14, preferably of the multiple disk type, selectively engaged by means of a hand lever 15 on a rock shaft 16 carrying a clutch shifter 17, all as usual, the hand lever being movable to opposite clutch-engaging positions and to an intermediate neutral position.

A shaft 18 is journalled in the head casing 11 in parallel relation to the spindle and is driven from any suitable source of power, such as a direct-connected electric motor 19, preferably of a multiple speed or adjustable speed type. In some instances, the shaft 18 may be belt-connected to a motor or to a line shaft, as is well understood in this art. The shaft 18 is provided with friction clutches 20 and 21, preferably of the multiple disk type, selectively engaged by means of a shifter 22, all as usual, the shifter being movable to opposite clutch-engaging positions and to an intermediate neutral position. In the present instance, the shifter 22 is carried on a vertical rock shaft 23 provided at its upper end with a hand lever 24 extending to the front of the head casing.

The driven elements of the clutches 20 and 21 carry respective gears 25 and 26. A shaft 27 is journalled in the head casing in parallel relation to the shaft 18 and carries gears 28 and 29. The gear 28 meshes with the gear 25, and the gear 29 meshes with a reversing gear 30 journalled in the casing, which latter gear in turn meshes with the gear 26, so that when the clutch 20 is engaged the shaft 27 is driven in forward direction through the gears 25 and 28, and when the clutch 21 is engaged the shaft 27 is driven in reverse direction through the gears 26, 30, and 29.

An intermediate shaft 31 is journalled in the upper portion of the head casing on suitable anti-friction bearings and is driven in any suitable manner from the shaft 27, as by means of a silent chain 32 meshing with sprockets 33 and 34 respectively carried on the shafts 27 and 31. Shafts 35 and 36, preferably in the form of aligned stub shafts, are journalled in the upper portion of the head casing in parallel relation to the shaft 31 and are drivingly connected with the driving elements of the spindle clutches 13 and 14 in any suitable manner, as by means of silent chains 37 and 38, the chain 37 meshing with sprockets 39 and 40 on the stub shaft 35 and spindle clutch 13, respectively, and the chain 38 meshing with sprockets 41 and 42 on the stub shaft 36 and spindle clutch 14, respectively, so that when the clutch 13 is engaged the spindle will be driven from the stub shaft 35 by the chain 37, and when the clutch 14 is engaged the spindle will be driven from the stub shaft 36 by the chain 38.

The shaft 31 has splined opposite ends which extend into respective gear chambers 43 and 44 formed on opposite side walls of the head casing.

The stub shafts 35 and 36 have splined outer ends which extend into the gear chambers 43 and 44 respectively, the inner ends of these shafts being journalled in an intermediate wall 45 formed in the head casing. The gear chamber 43 receives therein a pair of meshing pick-off or change gears 46 and 47 which are slidably keyed on the splined ends of the shafts 31 and 35, respectively, to establish a driving connection between these shafts. The gear chamber 44 similarly receives therein a pair of meshing pick-off or change gears 48 and 49 which are slidably keyed on the splined ends of the shafts 31 and 36, respectively, to establish a driving connection between these shafts. The gear chambers 43 and 44 are closed at their outer sides by hinged doors 50 and 51, respectively, each provided with a suitable latch or lock 52. The inner face of each door is preferably formed with a pair of recesses 53 to receive the outer ends of the pick-off gear shafts, and the doors when closed are engageable with the hubs of the pick-off gears to confine these gears against axial shifting.

In setting up the machine for use, the hinged door 50 is swung open to the dotted line position of Fig. 1, a selected set of pick-off gears 46 and 47 are slid onto the splined ends of shafts 31 and 35, and the door is then closed and latched to enclose the gear chamber 43 and to hold the pick-off gears in place. In a similar manner, a selected set of pick-off gears 48 and 49 are mounted in the gear chamber 44 and are held in place by the hinged door 51. The pick-off gears 46 and 47 determine the high spindle speed, while the pick-off gears 48 and 49 determine the low spindle speed, so that the ratio of high spindle speed to low spindle speed can be adjusted over a wide range, and in small increments, by proper selection of the pick-off gears. If the drive shaft 18 runs at a single speed, or at any one of two or more widely separated speeds, the pick-off gears are also used to adjust the spindle speeds to the desired values, in addition to adjusting the ratio of the spindle speeds. If the speed of the drive shaft 18 is adjustable in small increments, then it is only necessary to so select the pick-off gears as to give the desired ratio between the high spindle speed and the low spindle speed.

For both low and high spindle speeds, forward and reverse, power is transmitted from the drive shaft 18 to the shaft 31 as hereinbefore described. For low spindle speed, power is transmitted from the shaft 31 to the stub shaft 36 by the pick-off gears 48 and 49, and from the stub shaft 36 to the spindle clutch 14 by the silent chain 38. For high spindle speed, power is transmitted from the shaft 31 to the stub shaft 35 by the pick-off gears 46 and 47, and from the stub shaft 35 to the spindle clutch 13 by the silent chain 37.

In operation, work is chucked on the spindle in any usual manner, the hand lever 24 being then in neutral position, and the motor being started. The hand lever 24 is then shifted to engage the forward clutch 20 and the hand lever 15 is shifted to engage one of the spindle clutches 13 and 14, say the low speed clutch 14. The work is then subjected to a cutting operation which requires the low spindle speed. Thereafter, the work is subjected to a second cutting operation requiring the high spindle speed, and for this operation the hand lever 15 is thrown to the opposite position to engage the high speed clutch 13, without bringing the spindle to an intervening stop. If the spindle is to be reversed, as in certain thread-cutting operations, the hand lever 24 is shifted to "reverse" position to engage the reversing clutch 21, the spindle running at either low speed or high speed, as desired.

By means of the invention, the operator is able to change quickly from one selected spindle speed to another selected spindle speed, so that successive cutting operations on the work may be effected at the most favorable speeds and without unnecessary loss of time.

What I claim as new and desire to secure by Letters Patent is:

In a machine tool, the combination of a spindle, a plurality of shafts having respective driving connections with said spindle, said driving connections including respective selectively engageable friction clutches each operable in either direction of rotation, an intermediate shaft, respective sets of power-transmitting pick-off gears connecting said intermediate shaft and first-named shafts, driving means for said intermediate shaft including forward gearing and reverse gearing, and selectively engageable friction clutches for controlling said forward and reverse gearing.

HERBERT E. TAUTZ.